US009824320B2

(12) United States Patent
DeJardine et al.

(10) Patent No.: US 9,824,320 B2
(45) Date of Patent: Nov. 21, 2017

(54) SYSTEM AND METHOD FOR PROVIDING RECONFIGURABLE WORKFLOWS (71) Applicant: AT&T Intellectual Property I, L.P., Atlanta, GA (US)

(72) Inventors: Adam DeJardine, Johns Creek, GA (US); Walter Bullard, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 360 days.

(21) Appl. No.: 14/040,321

(22) Filed: Sep. 27, 2013

(65) Prior Publication Data
US 2015/0095097 A1   Apr. 2, 2015

(51) Int. Cl.
G06Q 10/00 (2012.01)
G06Q 10/06 (2012.01)
(52) U.S. Cl.
CPC ... *G06Q 10/0633* (2013.01); *G06Q 10/06316* (2013.01)
(58) Field of Classification Search
CPC ................................................. G06Q 10/06316
USPC ........................................................ 705/7.26
See application file for complete search history.

(56) References Cited

U.S. PATENT DOCUMENTS

| 7,657,590 | B2 | 2/2010 | Reading et al. |
| 7,853,467 | B2 | 12/2010 | Aboujaoude et al. |
| 7,882,209 | B1 | 2/2011 | Eslambolchi et al. |
| 7,885,844 | B1 | 2/2011 | Cohen et al. |
| 7,945,470 | B1 | 5/2011 | Cohen et al. |
| 8,009,820 | B2 | 8/2011 | Curtis |
| 8,117,549 | B2 | 2/2012 | Reiner |
| 8,136,114 | B1 | 3/2012 | Gailloux et al. |
| 8,180,668 | B2 | 5/2012 | Wargin et al. |
| 8,199,670 | B2 | 6/2012 | Mishra et al. |

(Continued)

FOREIGN PATENT DOCUMENTS

| CA | 2428605 | 6/2002 |
| WO | WO 0177955 A1 | 10/2001 |
| WO | WO 2005033933 A1 | 4/2005 |

OTHER PUBLICATIONS

Singh, M. P., et al., "Automating Workflows for Service Order Processing: Integrating AI and Database Technologies", *IEEE Expert*, vol. 9, No. 5, 1994, pp. 19-23.

(Continued)

*Primary Examiner* — Sujay Koneru (57) ABSTRACT

Methods, non-transitory computer-readable media and apparatuses for modifying a task flow are disclosed. For example, a method receives a request to modify the task flow template which is associated with a plurality of task flow modification rules. The method determines whether the request violates a modification rule of the plurality of task flow modification rules. A first rule specifies that no automated tasks in the task flow template can be deleted and a second rule specifies that no automated task in the task flow template can be moved to precede another automated task on which it depends. The method rejects the request when the request is determined to violate one of the first rule and the second rule of the plurality of task flow modification rules. Otherwise, the method modifies the task flow template in accordance with the request to produce a modified task flow template.

18 Claims, 4 Drawing Sheets

(56) References Cited

U.S. PATENT DOCUMENTS

| | | | |
|---|---|---|---|
| 8,260,893 B1 | 9/2012 | Bandhole et al. | |
| 8,265,980 B2 | 9/2012 | Ochs et al. | |
| 8,447,859 B2 | 5/2013 | Bobyak et al. | |
| 2002/0123339 A1 | 9/2002 | Boehmke | |
| 2005/0004825 A1* | 1/2005 | Ehrler | G06Q 10/06311 705/7.17 |
| 2007/0124361 A1 | 5/2007 | Lowry et al. | |
| 2007/0300224 A1* | 12/2007 | Aggarwal | G06Q 10/06 718/100 |
| 2008/0028317 A1* | 1/2008 | Castelli | G06Q 10/109 715/744 |
| 2008/0065453 A1 | 3/2008 | Settuducati et al. | |
| 2009/0164996 A1* | 6/2009 | Baeuerle | G06Q 10/06 718/100 |
| 2009/0276265 A1 | 11/2009 | Ahmed et al. | |
| 2010/0269049 A1 | 10/2010 | Fearon | |
| 2011/0282707 A1* | 11/2011 | Rangaswamy | G06Q 10/06 705/7.26 |
| 2011/0301996 A1 | 12/2011 | Johnson et al. | |
| 2012/0109719 A1 | 5/2012 | Parmar et al. | |
| 2012/0203586 A1 | 8/2012 | Blakely | |
| 2013/0197958 A1 | 8/2013 | Kawecki et al. | |

OTHER PUBLICATIONS

Bangemann, T., "PROTEUS-Creating Distributed Maintenance Systems Through an Integration Platform", *Computers in Industry*, vol. 57, No. 6, 2006, pp. 539-551.

Senkul, P., et al., "An Architecture for Workflow Scheduling Under Resource Allocation Contraints", *Information Systems*, vol. 30, No. 5, 2005, pp. 399-422.

\* cited by examiner

SYSTEM AND METHOD FOR PROVIDING RECONFIGURABLE WORKFLOWS

The present disclosure relates generally to task flows, or workflows, and more specifically, to managing modifications to such task flows.

BACKGROUND

Network provisioning in the mobility space has more churn in terms of design and equipment versus standard telecommunication networks. There is constantly new equipment coming out which changes the way that work is performed. It is difficult to support such projects using standard business process workflows because it takes significant development efforts and is costly to continually fund new projects to keep up with current research, new tools and technology in the mobility space. Thus, a process workflow for mobility networks needs to be flexible and needs to be made quickly. However, current workflow creation tools may be inadequate to match the pace of development. In particular, traditional Business Process Execution Language (BPEL) based workflows are powerful tools for automating business processes and are designed specifically for orchestration. However, alterations to BPEL-based workflows typically require redeployment of the code, i.e., by workers with programming skills, in order to make any changes. One solution involves developing a workflow from scratch in a primary programming language, e.g., entirely in Java. This allows configurability by modifying metadata in a database.

SUMMARY

In one embodiment, the present disclosure provides a method for modifying a task flow template. For example, the method receives a request to modify the task flow template which is associated with a plurality of task flow modification rules. The method determines whether the request violates a modification rule of the plurality of task flow modification rules. A first rule specifies that no automated tasks in the task flow template can be deleted and a second rule specifies that no automated task in the task flow template can be moved to precede another automated task on which it depends. The method rejects the request when the request is determined to violate one of the first rule and the second rule of the plurality of task flow modification rules. The method modifies the task flow template in accordance with the request to produce a modified task flow template, when the request is not determined to violate one of the first rule and the second rule of the plurality of task flow modification rules. The method then displays the modified task flow template.

In another embodiment, the present disclosure provides a non-transitory computer-readable medium that stores instructions which when executed by a processor, cause the processor to perform operations for modifying a task flow template. The operations include: receiving a request to modify the task flow template which is associated with a plurality of task flow modification rules and determining whether the request violates a modification rule of the plurality of task flow modification rules. A first rule specifies that no automated tasks in the task flow template can be deleted and a second rule specifies that no automated task in the task flow template can be moved to precede another automated task on which it depends. The operations further include: rejecting the request when the request is determined to violate one of the first rule and the second rule of the plurality of task flow modification rules, modifying the task flow template in accordance with the request to produce a modified task flow template, when the request is not determined to violate one of the first rule and the second rule of the plurality of task flow modification rules, and displaying the modified task flow template.

In still another embodiment, the present disclosure provides a method for modifying a task flow instance. For example, the method receives a request to modify the task flow instance which is associated with a plurality of task flow modification rules. The method determines whether the request violates a modification rule of the plurality of task flow modification rules. A first rule specifies that no automated tasks in the task flow instance can be deleted and a second rule specifies that no automated task in the task flow instance can be moved to precede another automated task on which it depends. The method rejects the request when the request is determined to violate one of the first rule and the second rule of the plurality of task flow modification rules. The method modifies the task flow instance in accordance with the request to produce a modified task flow instance, when the request is not determined to violate one of the first rule and the second rule of the plurality of task flow modification rules. The method then displays the modified task flow instance.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer readable media, and apparatuses for creating, editing, modifying and observing workflows, or task flows, which include a combination of automated and manual tasks. Embodiments of the present disclosure provide users with the ability to predict and see the future of the task flow as it progresses and the ability of a user to modify the task flow, but in a constrained way, such that the user does not break the system and is limited to only "safe" portions of the task flow. In particular, embodiments of the present disclosure provide a highly flexible, modular workflow engine that allows for rapid turnaround of minor changes to the flow. By coupling a collection of automated processes implemented in Business Process Execution Language (BPEL) with a task flow templating engine and driver implemented in Java (or any language capable of web services and database connectivity) backed by a rules engine for decision-making, the task flow may be modified by simply updating tables in a database. The main task flow itself is completely dynamic. Thus, the code deployed to the system does not need to change, and minor changes to the system can be activated immediately by business personnel, e.g., users without computer programming skills. In contrast, alterations to BPEL-based workflows typically require redeployment of the code, i.e., by users with programming skills, in order to make any changes. In addition, in traditional BPEL-based workflows, there is no convenient means to display to end users what steps in the task flow will be performed next. Embodiments of the present disclosure provide the flexibility of configuring a task flow entirely in the database with the robustness of BPEL-based task flows for allowing users to better anticipate staffing needs as the task flow progresses, to more accurately answer questions about when certain tasks will take place, and so forth.

The following terms are used herein:

Work Order—a plan or request for an activity or specific outcome, which will require a number of tasks to be completed in order to reach the specific outcome. For example, a request may be to deploy a new cell tower in a network. A number of tasks to reach this outcome may include: generating a site survey, requesting and receiving permits from various state and federal agencies, ordering of equipment, transporting equipment to the location, laying a foundation, erecting the tower, connecting to the backhaul, adjusting the sectors, testing signal strength, and so forth. The work order may include data relating to the request, such as a location or set of locations, a budget, a number of available personnel to devote, a start date, a desired end date, and so forth.

Task Flow/Work Flow—a task flow, or a work flow, comprises an arrangement of tasks/steps to be performed in order to reach the goal and/or produce the result requested in the work order. A task flow may include not only the tasks to be performed, but the order in which the tasks follow from one another, i.e., the task dependencies and conditional rules relating to the tasks and/or the entire task flow. In various embodiments, the tasks in a task flow may include both automated tasks and manual tasks. In addition, some tasks may comprise a "sub-flow" having a sequence of tasks to be performed. A task flow is often represented graphically in a flow chart where different tasks are represented by boxes and directional arrows between tasks show which tasks precede and which task follow from one another.

Task Flow Template—a preexisting task flow archetype designed for a particular activity type. In one example, the present disclosure assumes that a task flow template will exist for the specific activity requested in the work order.

Task Flow Instance—a task flow created by copying the task flow template for a particular activity type when a work order relating to the particular activity type is created or received. The task flow instance may, but need not be modified from the task flow template to tailor the task flow, e.g., based upon data relating to the work order, such as a location where the requested activity will take place, a budget, a number of available personnel to devote to the requested activity, a start date, a desired end date, and so forth.

Figure 1:
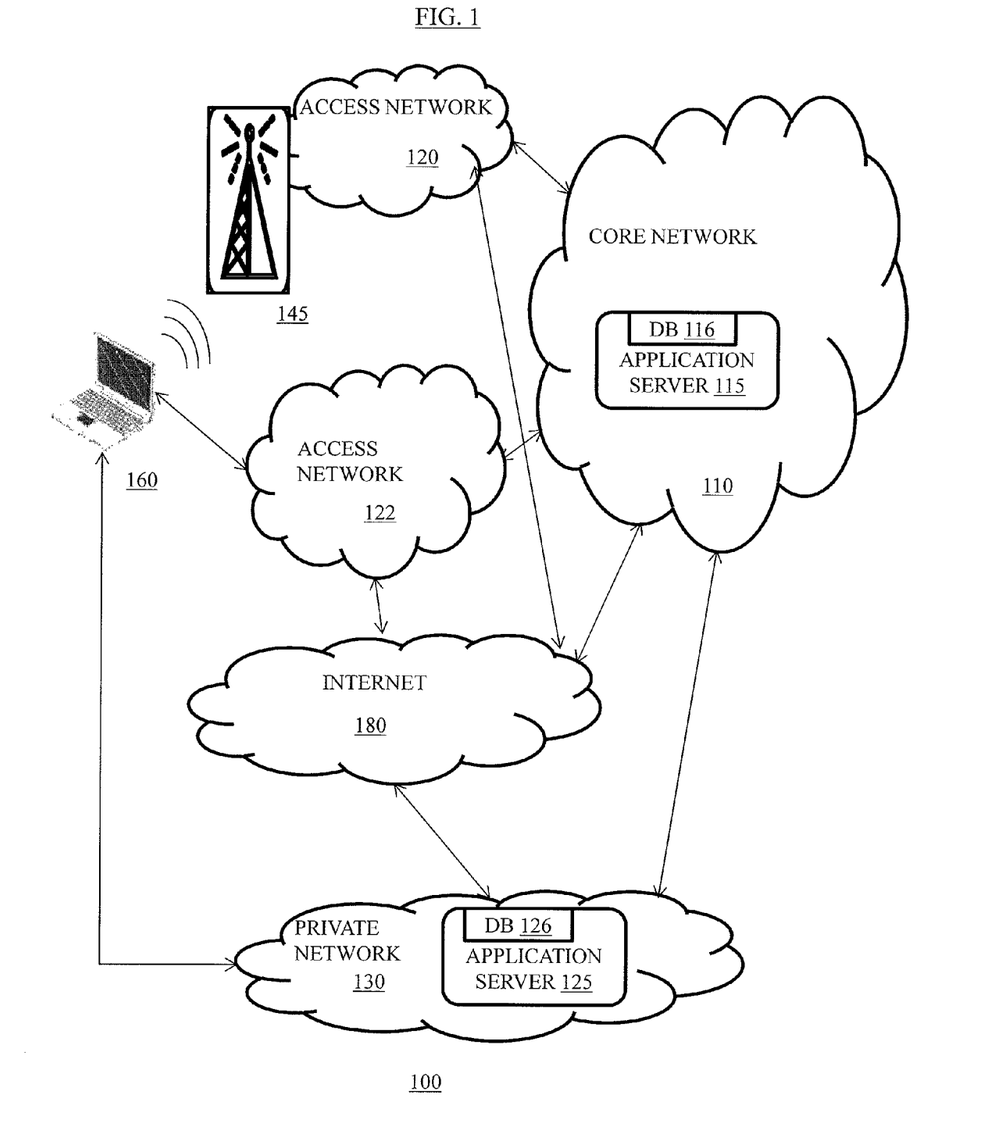
FIG. 1 illustrates one example of a communication network of the present disclosure.

To aid in understanding the present disclosure, FIG. 1 illustrates a block diagram depicting one example of a communication network 100 suitable for performing or enabling the steps, functions, operations and/or features described herein. The overall communication network 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As shown in FIG. 1, the system 100 connects a user device 160 with one or more application servers via a core network 110, access networks 120 and 122, private network 130 and/or Internet 180. In one embodiment, core network 110, e.g., an IP network, interfaces with one or more of the access networks 120 and 122, and may also include interfaces to the Internet 180 and/or private network 130. Access network 120 may comprise a wireless access network (e.g., an IEEE 802.11/Wi-Fi network and the like) or a cellular access network, and may include a cellular base station and/or wireless access point 145. In one embodiment, access network 122 may comprise a PSTN access network, a cable access network, a wired access network and the like. In one embodiment, the access networks 120 and 122 and the core network 110 may be operated by different service providers, the same service provider or a combination thereof. In embodiment, the core network 110 may be operated by a communication network service provider. In addition, private network 130 may comprise a corporate intranet, a network of an educational institution, a home network, and the like. For example, user device 160 may provide local or remote access for a corporate employee, a student, etc., to private network 130, either directly or through one or more intermediate networks. Various interconnections between access networks 120 and 122, core network 110, Internet 180 and private network 130 are shown. In accordance with the present disclosure, it is contemplated that devices may utilize any one or a combination of such networks and interfaces in order to communicate with one another.

Figure 4:
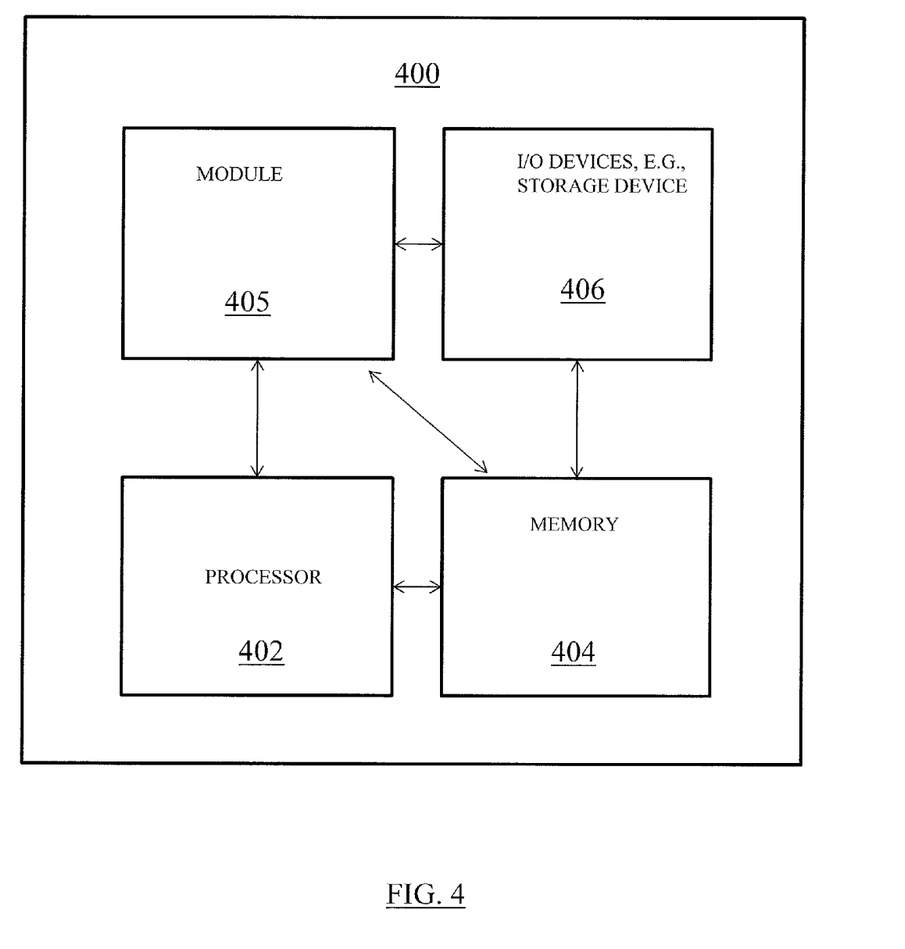
FIG. 4 illustrates a high-level block diagram of a general-purpose computer suitable for use in performing the functions described herein.

In one embodiment, the core network 110 may include an application server (AS) 115 and a database (DB) 116. Although only a single AS 115 and a single DB 116 are illustrated, it should be noted that any number of application servers 115 or databases 116 may be deployed. In one embodiment, the AS 115 may comprise a general purpose computer as illustrated in FIG. 4 and discussed below. In one embodiment, the AS 115 hosts a program for creating, editing, viewing and managing task flows in accordance with the present disclosure. As such, DB 116 may store program code, data, files, and so forth in connection with such a program. Similarly, private network 130 may include an application server (AS) 125 and a database (DB) 126, which may be the same or similar to AS 115 and DB 116 in the core network 110.

In one embodiment, user device 160 may comprise any endpoint device configured for wireless or wired communication such as a personal computer, a laptop computer, a Personal Digital Assistant (PDA), a mobile phone, a smart phone, an email device, a tablet, a messaging device, and the like. In one embodiment, user device 160 provides access to a user to either or both of the application servers 115 and 125 to create, modify and access task flows in accordance with the present disclosure.

It should be noted that the network 100 has been simplified. For example, the network 100 may include other network elements (not shown) such as border elements, routers, switches, policy servers, security devices, gateways, a content distribution network (CDN) and the like. Thus, FIG. 1 is only intended to illustrate one exemplary environment in which embodiments of the present disclosure may be employed. In addition, although FIG. 1 illustrates a user device 160 for accessing application servers 115 and 125, in a different embodiment, the present disclosure may be implemented via a console integrated with AS 115 and/or 125, or may even comprise a stand-alone device. For instance, in one example, computing device 400 in FIG. 4 may comprise such a standalone device which may host and store a program and related data for creating, editing, viewing and managing task flows in accordance with the present disclosure.

Figure 2:
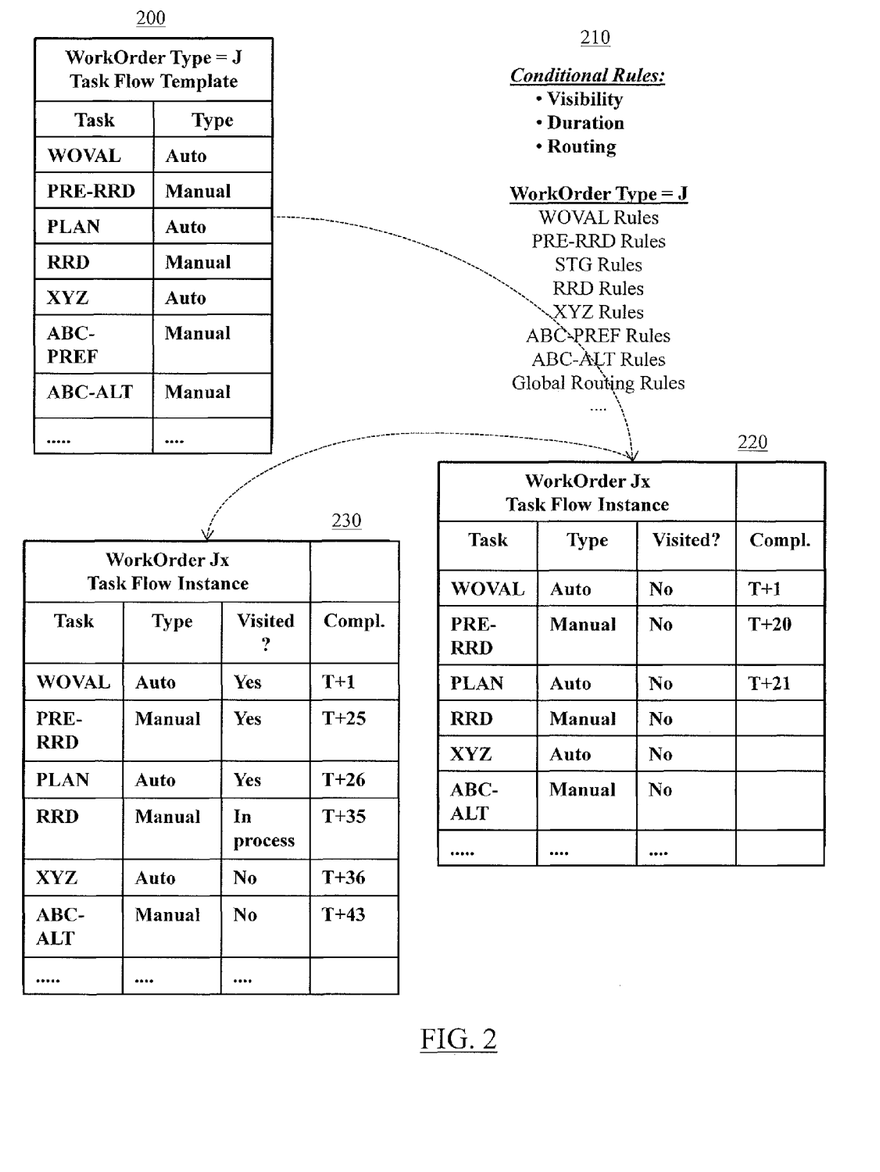
FIG. 2 illustrates an example of creating a task flow instance from a task flow template for a work order.

To further aid in understanding, FIG. 2 illustrates an example of the creation and progression of a task flow instance, i.e., a task flow. As mentioned above, in one example the present disclosure assumes that a task flow template exists for a particular requested activity of a work order. For example, an employee of a mobile network provider may submit a work order for the deployment of a new cell tower in Monmouth County, N.J. Accordingly, in one example it is assumed that a work flow template exists for this type of activity. As shown in FIG. 2 the deployment of a new cell tower has previously been given work order type "J" which has a template 200.

In one example, templates are created by a designer, or a development team, and made available to users who need to implement task flows to fulfill various work orders. To illustrate, a first task flow template may be created by a development team for the deployment of new cell towers. Another task flow template may be created by the same or a different development team for upgrades to a backhaul to support fourth generation (4G) technology. Note that the present disclosure is not limited to work orders and task flows related to mobility networks or to telecommunication network in general. Rather, embodiments of the present disclosure are broadly applicable to all categories of task flows which support complex business processes. In any case, when a work order is received, the work order type is determined and an appropriate task flow template is retrieved. For instance, if the work order is for deploying a new cell tower, the task flow template for deploying a new cell tower is retrieved.

In the example of FIG. 2, task flow template 200 is retrieved, which includes a set of tasks that comprise the work flow and an indication as to whether each task is a manual task or an automated task. In addition to the set of tasks, the task flow template 200 may include or is associated with a set of conditional rules 210, comprising e.g.: (1) visibility/inclusion rules—for determining whether and under what conditions each task in the task flow template 200 should be included in a specific instance of the task flow, (2) duration rules—for determining the anticipated duration of the task, (3) routing rules—primarily for determining which work group(s) will perform manual tasks, and (4) task flow rules—for restricting or constraining modifications to the task flow in general and/or to particular tasks or subsets of tasks. These rules or parameters are created by the designer/development team when creating a task flow template 200. In one example, the rules may be linked to the task flow template, stored in a data structure along with the task flow template, or may comprise a library or database of rules which are retrieved by a task flow program and applied to a the task flow template. An ability to modify the task flow template, and any task flow instances derived from the template, is provided to all users, but is constrained within these rules, as described in greater detail below.

As an example of a visibility rule, task flow template 200 includes the tasks "ABC-PREF" (ABC preferred) and "ABC-ALT" (ABC alternative). Depending upon input data as part of the work order, either one, but not both of these tasks may be performed. For example, a conditional rule may specify that when the work order is for an activity to take place in the northeastern United States, that ABC-PREF should not be included in a specific instance of the task flow. Similarly, another conditional rule may specify that ABC-ALT should be performed when the work order is indicated to be an activity to be performed in the northeastern United States. Task flow instance 220 shows the outcome of this evaluation process over the task flow template for a specific work order. For example, as described above the work order may request the deployment of a new cell tower. In addition, the work order includes accompanying input data such as the location, e.g., Monmouth County, N.J., the maximum budget, the desired start date, the number of personnel to devote to the project, and so forth. Thus, using this input data, the conditional rules can be evaluated to determine that ABC-PREF should be excluded, while ABC-ALT should be included. Accordingly, as illustrated in FIG. 2, the task flow instance 220 created from the task flow template 210 for this specific work order includes only ABC-ALT, whereas ABC-PREF is omitted.

The following illustrates the use of conditional rules relating to task duration, or "durational rules." In particular, as shown in task flow instance 220, the first task "WOVAL" (which may stand for "work order validation") is an automated task which has an anticipated completion time of T+1, where T=0 may comprise an arbitrary start time. Increments may be business days, business hours, or any other measure of time. For illustrative purposes, the increments are considered to be business days. Thus, it is anticipated that the automated task WOVAL will be completed 1 business day after the commencement. On the other hand, the next task "PRE-RRD" is a manual task and is anticipated to be completed 20 business days after the start of the project.

In order to make predictions about when future tasks will commence and be completed, in one embodiment all of the conditional rules relating to task duration for a sequence of tasks in the task flow are pre-evaluated. Notably, other approaches, such as current deployments of Business Process Execution Language (BPEL), only evaluate conditional rules, e.g., IF conditions, when the IF conditions are encountered as the work flow progresses. In contrast, embodiments of the present disclosure advantageously provide a future view of the task flow, enhancing the ability for those involved in the project to plan and anticipate future developments. For example, each task may include a number of durational rules, such as IF conditions, that may contribute to a prediction of the time it takes to complete the task. One example is: IF number_of_personnel={10-15} THEN time_to_complete=10; IF number_of_personnel={15-25} THEN time_to_complete=5. Another example is: IF location=Minnesota and date={December, January, February} THEN time_to_complete=March 1+15. To illustrate, the particular task may comprise pouring a concrete foundation, which is best not performed during cold months. Accordingly, the task may only have a 15 business day anticipated duration, but according to the development team that created the task flow template 200, the task should not be commenced until at least March 1, regardless of the completion status of any previous tasks. In another example, one task may have a duration of two business days if the work order relates to the eastern United States, or three business days if the work order relates to the western United States, or it may be two or three business days depending upon the type of vendor. These are only several examples and should not be interpreted as limitations on the present disclosure. Thus, there can be various conditions which determine the anticipated duration of a task.

In one example, conditional rules relating to duration are only pre-evaluated up to an interim point of confidence, beyond which the designer considers the predictions are not useful or reliable. For example, as the beginning tasks are completed, more data may become available that is required to evaluate the estimated times for completion of future tasks. Before these initial tasks are completed, any estimates about the latter tasks may be uncertain. The time to complete latter tasks, and whether certain latter tasks will even be performed in the particular flow may be dependent upon the outcome of an earlier task. For instance, the future of the task flow may be dependent upon the sub-soil structure that is found in an earlier site-evaluation task. It may take a longer time and require more material and manpower to establish a site foundation for a base station where there is a high water table and silt versus a dry spot with compacted clay. In another example, the task flow instance 220 may include multiple branches where a decision task may select which branch to eventually follow. For example, if a site survey determines that the ground of the site has an incline of greater than 30 degrees, the task flow instance 220 may include a branch or subset of tasks that needs to be performed, whereas if the ground is substantially level, that particular branch of the task flow instance need not be performed. However, the designer and the user(s) implementing the task flow may not have the ability to predict whether this condition is fulfilled until the project commences.

As also shown in FIG. 2, in the task flow instance 220 the third task is "PLAN", which represents a planning point. Only the first two tasks up to the planning point have been pre-evaluated and include completion time estimates. In a different embodiment, the present disclosure may pre-evaluate all conditional rules relating to duration for all tasks in a task flow instance, but may include signals to indicate predictions which are not reliable. For example, a visual representation of the task flow instance may display washed out or grayed completion time predictions for tasks which are deep into the task flow.

Task flow instance 230 shows the same task flow instance 220 at a later time, e.g., after the first planning point has been reached. Notably, the times for the first two tasks, as well as for the third task (the planning point) are the actual completion times. In one example, the planning point itself comprises an automated task that is part of the task flow. Its purpose is to evaluate the durational rules/conditions relating to the next sequence of task following the planning point up to a next planning point, or up to the end of the task flow. As shown, task "RRD" is a manual task that is in progress with an anticipated completion time of T+35 (35 business days after the commencement of the project). The next tasks "XYZ" and "ABC-ALT" are automated and manual tasks respectively having the anticipated completion times shown in the figure.

As mentioned above, the task flow template 200 may also include global task flow modification rules which restrict the customizability of the task flow template and any task flow instances created form the task flow template. In addition, the task flow template 200 may include more localized task flow modification rules which restrict modifications that may be made to certain portions of the task flow, e.g., to a subset of tasks which are grouped together, to a specific task, and the like. Notably, a user may have various legitimate reasons to need to modify a task flow. For example, a user may need to account for a previously unplanned site inspection, an audit, damage caused by a weather event, and so forth. However, the designer may wish to limit the ability of users to modify a task flow such that the users are guaranteed to not break the task flow. In accordance with the present disclosure, some task flow modification rules are so ubiquitous that the rules are applicable by default to all task flows, e.g., "universal" task flow modification rules. Examples of universal or global task flow modification rules include: a rule that no automated tasks in the task flow can be deleted, and a rule that a new task cannot be inserted before an automated task in the task flow that depends upon a preceding automated task. Other rules of this nature include: a rule that a manual task may be inserted into the task flow, a rule that an automated task cannot be inserted into the task flow, a rule that an approved automated task can be inserted into the task flow and a non-approved automated task cannot be inserted into the task flow, a rule that a manual task cannot be inserted between two automated tasks in the task flow which having a rule (e.g., a local rule) that specifies the two automated tasks cannot be separated, a rule that a task cannot be deleted from the task flow unless the task is a manual task that has previously been inserted into the task flow, and a rule that a task cannot be inserted between two tasks in a sequence of tasks where one of the tasks in the sequence is currently being performed (e.g., where a local rule of the task flow is associated with the sequence of tasks and specifies that the sequence of tasks cannot be interrupted). In another example, a universal rule may comprise a rule that the durational rule of a task is changeable for manual tasks and is not changeable for automated tasks. In one example, an approved automated task is available from a palette of automated tasks designated by the designer as safe to include in the task flow. For example, an automated scan of configuration settings or other read-related tasks may always be safe to insert in a task flow. For instance, no matter how many times a read task is performed, it will not have a measurable impact upon any other automated tasks.

Note that the foregoing are only several examples that are provided for illustrative purposes. In addition, some of the foregoing examples are mutually exclusive. Thus, different embodiments of a task flow template (and task flow instances derived therefrom) may have different sets of task flow modification rules applicable thereto. It should also be noted that two of the above examples describe "global" task flow modification rules which, in order to evaluate, require the existence and knowledge of "local" task flow modification rules. For instance, in order to determine whether a modification to a task flow requesting the insertion of a manual task violates the rule that "a manual task cannot be inserted between two automated tasks in the task flow having a rule that specifies the two automated tasks cannot be separated," there must be a rule applicable to two of the automated tasks that indicates the two tasks are linked in an unbreakable sequence and cannot be separated. Thus, the existence of this local rule enables the evaluation of the "global rule." Of course, if there are no local rules linking any two automated tasks together in an unbreakable chain, or if the user is seeking to insert a new task between automated tasks that are not linked, then this global rule is not applicable. In any case, in various examples the global task flow modification rules interact with local modification rules to provide a decision as to whether to accept or reject a request to modify the task flow instance.

As a further example of local rules, one or more rules may specify certain automated tasks before or after which a manual task cannot be inserted by the user, regardless of whether it is followed by an automated or a manual task. In another example, a local rule may specify that two adjacent tasks can be separated by the inclusion of a new task, but for no more than a particular duration of time, e.g., a task can be inserted so long as the anticipated duration of the task does not exceed 5 business days, 10 business days, etc. In still another example, the designer may include positive local rules such as specifying that a particular automated task can have a manual task follow it, regardless of whether another automated task follows it in the original task flow template. Similarly, in one example certain manual tasks included in the task flow template and instantiated in a task flow instance may be considered to be optional tasks. Thus, for example, if the designer indicates that a manual task is optional, in one embodiment a local rule may specify that this particular manual task may be deleted by a user from the task flow instance, notwithstanding the fact that the task was included in the original task flow instance created from the task flow template. In another example, a manual task in the task flow may have a rule that specifies whether or not a visibility/inclusion rule can be added to the task, or whether such a visibility/inclusion rule can be modified, if already present. In still another example, certain manual tasks may be tagged with rules that indicate whether or not the manual task can be moved. For instance, certain manual tasks may have no particularly important order of performance with respect to one another, e.g., signal testing of a new base station can proceed while painting of certain components and landscaping is planted to screen the site. On the other hand, some tasks may have a specific required order of performance, e.g., to deploy a new cell tower, a concrete foundation must be poured before the mast can be erected. As such, local rules associated with one or more of the tasks may grant appropriate permissions and place appropriate constraints on users to be able to rearrange/not rearrange the task flow. In one example, such local rules allow rearrangement of certain groups of tasks in relation to one another while ensuring that certain tasks that must be performed together and/or sequentially, remain in the particular order. For example, the order of performance of two blocks of tasks may be swapped, while the tasks within each block remain in the same order with respect to one another. In one example, any manual task that is inserted in the task flow has a default maximum time duration. Thus, a user cannot insert a manual task with a non-specific anticipated time duration or a duration that exceeds the default, e.g., 5 business days, 20 business days, and so forth. Other limitations of this nature may be imposed on the tasks inserted by a user to maintain the integrity of the task flow. Thus, the inclusion of local and global task flow modification rules in the task flow template guarantees that users who seek to modify task flow instances created from such templates are able to customize the task flow, but are constrained in such a way that these users cannot break the task flow and only affect "safe" portions of the task flow.

In addition, where a task flow instance is modified in compliance with such rules, the estimated completion dates of subsequent tasks in the task flow may be re-evaluated. For example, the pre-evaluation of the conditional rules relating to duration for subsequent tasks may be evaluated again in order to account for the time estimated for the inclusion of a new task, the deletion of a task, or the rearrangement of one or more tasks. In one embodiment, all durational rules for tasks that follow from an inserted or deleted task up to a next plan point or to the end of the task flow are re-evaluated.

Although not illustrated in FIG. 2, embodiments of the present disclosure may employ a work order engine for receiving a work order, for orchestrating the actual implementation of a task flow, for interfacing with users and/or for displaying task flows and task flow progress for such users. For example, the work flow engine may be implemented in one of the application servers 115 or 125, or in user device 160 in FIG. 1, or may be implemented as a computing device, such as computing device 400 in FIG. 4 described below.

In one embodiment, the work order engine has two primary components, a task execution main flow, and a task allocation flow. In one example, the purpose of the task execution main flow is to send instructions and call the appropriate work centers, personnel or automated resources to perform various tasks, and to accounting for the completion of the assigned tasks. For example, the task execution main flow may instruct a device, server, or even a component of the same system/device on which it resides to perform the first automated task "WOVAL" in the task flow instance 220. In one embodiment, the task execution main flow sends automated tasks to an automated task handler to actually assign-out the automated task. The task execution main flow may also assign manual task to appropriate work centers. For example, as mentioned above, tasks in a task flow may have routing rules which specific work center(s) to which the task should be assigned. In one embodiment, the task execution main flow passes the manual task to a manual task handler for further processing and to make the actual task assignment to a work center. In one example, the task execution main flow and/or manual task handler provides a dialog box or other user interface to an appropriate user, e.g., a manager, to indicate that a particular manual task is ready to be worked and to provide an opportunity for the user to indicate the completion of the manual task, e.g., by sending a reply message back to the manual task handler and/or task execution main flow.

In one embodiment, the purpose of the task allocation flow is to retrieve upcoming tasks in the task flow for processing by the task execution main flow. For example, the task execution main flow may command the task allocation flow to retrieve a next task, or set of next tasks from the task flow, so long as there are additional tasks available. In one embodiment, the task allocation flow is responsible for evaluating conditional visibility rules of the tasks in the task flow. Thus, in one example, the task execution main flow requests and receives from the task allocation flow only a portion of tasks in a task flow up to a next planning point. Accordingly, the view of the task flow instance provided to a user by the work order engine may only include tasks up to a next planning point. After a planning point is reached, the task allocation flow may then retrieve the next sequence of tasks up to a subsequent planning point (or to the end of the task flow), evaluate conditional visibility rules, and only pass those tasks which are evaluated to be included in the task flow instance to the task execution main flow.

Figure 3:
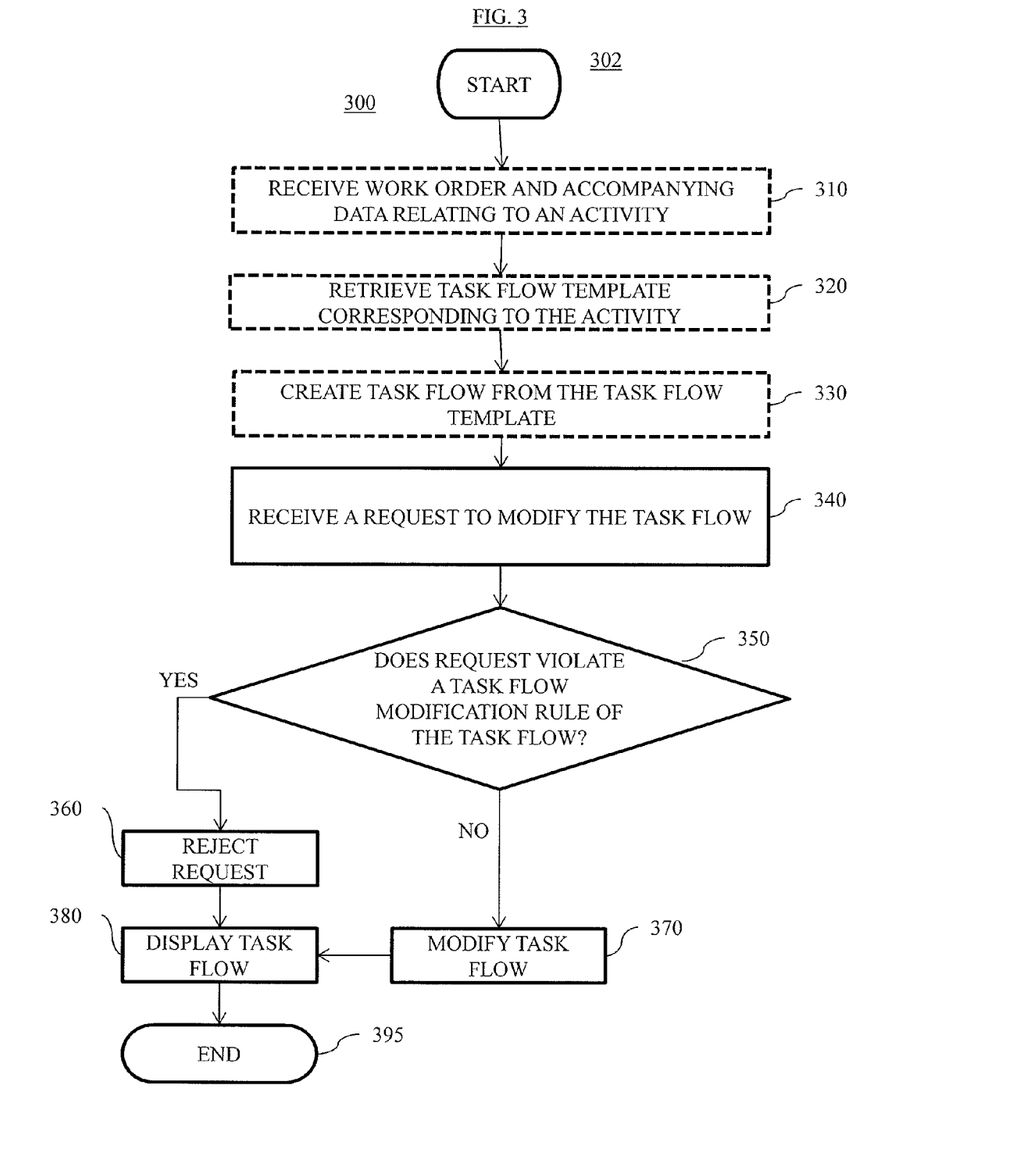
FIG. 3 illustrates an example flowchart of a method for modifying a task flow.

To further aid in understanding the present disclosure, FIG. 3 illustrates an example flowchart of one embodiment of a method 300 for modifying a task flow in accordance with the present disclosure. In one embodiment, the steps, functions, or operations of the method 300 may be performed by the user device 160, an application server such as AS 115 or 125, or a general purpose computer or computing device as described in FIG. 4 and discussed below.

The method 300 begins at step 302 and proceeds to optional step 310. At optional step 310, the method 300 receives a work order and accompanying data relating to an activity. For example, as described above the work order may be for the deployment of a new cell tower and may include data relating to the request, such as a location, a budget, a number of available personnel to devote, a start date, a desired end date, and so forth. For example, the accompanying data may indicate that the request is for deployment of the new cell tower in Monmouth County, N.J., 50 personnel are to be devoted to the project, the anticipated peak number of calls serviced by the cell tower is 1000 per hour, the desired start date is Jun. 1, 2013, and so forth.

At optional step 320, the method 300 retrieves a task flow template corresponding to the particular activity. For example, as described above a designer or development team may create a task flow template for a particular activity. Notably, the activity may be a complex business process which needs to be performed many times. Thus, a reusable task flow template may be created by experienced users. When a work order for the particular activity type is received, the method thus retrieves the appropriate task flow template, e.g., from a plurality of available task flow templates for various different activity types. As mentioned above, the task flow template may include a sequence of various tasks as well as conditional rules relating to visibility, duration, routing and/or task flow modification.

At optional step 330, the method 300 creates a task flow, or a "task flow instance," from the task flow template. In one embodiment, step 330 comprises evaluating conditional rules relating to visibility of a plurality of tasks. In one embodiment, the evaluation of the conditional rules is based upon the accompany data received with the work order at step 310. For instance, as shown in FIG. 2, task flow template 200 includes the tasks "ABC-PREF" (ABC preferred) and "ABC-ALT" (ABC alternative). Depending upon input data as part of the work order, either one, but not both of these tasks may be performed. For example, a conditional visibility rule may specify that when the work order is for an activity to take place in the northeastern United States, that ABC-PREF should not be included in a specific instance of the task flow. Similarly, another conditional visibility rule may specify that ABC-ALT should be performed when the work order is indicated to be an activity to be performed in the northeastern United States. Task flow instance 220 shows the outcome of this evaluation process over the task flow template for a specific work order. In any case, the task flow created at step 330 includes a plurality of tasks, relations and/or dependencies between the task, e.g., the order in which the tasks are to be performed, and conditional rules relating to duration, routing and/or task flow modification. The task flow may also include some or all of the input data received along with the work order at step 310.

In one embodiment, the task flow created at step 330 may include or is associated with one or more task flow modification rules that provide permissions and/or constraints on the ability of users to later modify the task flow. For example, the task flow created at step 330 may inherit the task flow modification rules from the task flow template from which it was created. In one example, the task flow modification rules are included in the task flow template by the template designer. In another example, the task flow modification rules are universal rules which are applicable across an organization to all task flow templates and all task flow created from such templates.

At step 340, the method 300 receives a request to modify the task flow. In various examples, the request may be to insert a new task in the task flow, to delete an existing task from, the task flow, or to rearrange/move tasks within the task flow. For example, a user may need to account for an unplanned site visit, an audit or an unexpected weather event. Similarly, a user may be instructed to provide an interim report on the status of the work order. Thus, the user may need to insert one or more tasks into the task flow to take inventory of various aspect of the project. Similarly, the user may be instructed to speed up the project and to reduce the scope of the project in order to meet the new deadline. Thus, the user may need to delete one or more tasks as a result.

At step 350, the method 300 determines whether the request violates a modification rule of the one or more task flow modification rules. For example, as mentioned above the task flow may include task flow modification rules in addition to the tasks, task dependencies and other data. The task flow modification rules may include both local and global rules. The task flow modification rules evaluated at step 350 may also include universal task flow modification rules which are applicable to all task flows across an organization. In one embodiment, the task flow modification rules, whether they be universal, global or local, may include: a rule that no automated tasks in the task flow can be deleted, and a rule that a new task cannot be inserted before an automated task in the task flow that depends upon a preceding automated task. The rules may also include: a rule that a manual task may be inserted into the task flow, a rule that an automated task cannot be inserted into the task flow, a rule that an approved automated task can be inserted into the task flow and a non-approved automated task cannot be inserted into the task flow, a rule that a manual task cannot be inserted between two automated tasks in the task flow when a local rule that specifies the two automated tasks cannot be separated, a rule that specifies a task cannot be deleted from the task flow unless the task is a manual task that has previously been inserted into the task flow, a rule that specifies a task cannot be inserted between two tasks in a sequence of tasks where one of the tasks in the series of tasks is currently being performed, e.g., where a local rule of the task flow is associated with the sequence of tasks and specifies that the sequence of tasks cannot be interrupted, a rule that permits a deletion of a manual task when the manual task has been marked in the task flow template as being non-essential, a rule that permits the movement/relocation of a group of tasks (but only as a block), and so forth.

If, at step 350, the method 300 determines that the request violates a task flow modification rule, the method proceeds to step 360. At step 360, the method 300 rejects the request. In one example, a message may be provided to a user to indicate that the request has been denied. However, in another example the user may be provided a warning, but is allowed to make the modification after explicitly disregarding warning.

If, at step 350, the method 300 determines that the request does not violate any one of the task flow modification rules (e.g., where no rule is applicable, or where a rule specifically permits the modification), the method proceeds to step 370. At step 370, the method 300 modifies the task flow to fulfill the request. For example, the method may insert a task, delete a task, rearrange or move a task or block of tasks, and so forth, depending upon the particular type of request that was received at step 340. The result of step 370 is a modified task flow.

Following either of steps 360 and 370, the method 300 proceeds to step 380. At step 380, the method 300 displays the task flow, or the task flow that has been modified. In one example, the display of the task flow includes a view of the completion status of each task in the task flow and anticipated completion times for all or a portion of the tasks in the task flow that have yet to be performed. For example, the task flow may be displayed as a list, e.g., as shown in FIG. 2. In one example, step 380 comprises re-evaluating various conditional rules for one or more task in the task flow up to a next planning point or to an end of the task flow. For instance, step 380 may include re-evaluating conditional rules, and more specifically the durational rules associated with each task from a point or task in the task flow relating to the modification request, e.g., from the point where a new task is inserted or a task is deleted, up to the next planning point (or to the end of the task flow). The re-evaluation for each subsequent task may account for the anticipated duration of a task that has been inserted into the task flow, a task that has been deleted from the task flow, and so forth.

Following step 380, the method proceeds to step 395 where the method ends.

It should be noted that although steps 340-380 of the method 300 have been described in connection with modifications to a task flow instance, the present disclosure is also applicable to modifications to the task flow itself. Thus, in one example steps 340-380 may be similarly applied to handling requests to modify the task flow template. In particular, at least a portion of the rules that may be invoked at step 250 with respect to modifications to a task flow instance may be equally applied to requests to modify the task flow template. In other words, the task flow template, in one embodiment may be considered a "master copy" of a task flow, or a task flow instance and may be modified, subject to the same rules/restrictions described above.

In addition, it should be noted that although not explicitly specified, one or more steps, operations or blocks of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 3 that recite a determining operation, or involve a decision, do not necessarily require that both branches of the determining operation be practiced. In other words, one of the branches of the determining operation can be deemed as an optional step. Furthermore, operations, steps or blocks of the above described method can be combined, separated, and/or performed in a different order from that described above, without departing from the example embodiments of the present disclosure.

FIG. 4 depicts a high-level block diagram of a general-purpose computer or system suitable for use in performing the functions described herein. For example, any one or more components or devices illustrated in FIG. 1 or described in connection with the method 300 may be implemented as the system 400. As depicted in FIG. 4, the system 400 comprises a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for modifying a task flow, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, the present module or process 405 for modifying a task flow can be implemented as computer-executable instructions (e.g., a software program comprising computer-executable instructions) and loaded into memory 404 and executed by hardware processor 402 to implement the functions as discussed above. As such, the present module or process 405 for modifying a task flow as discussed above in method 300 (including associated data structures) of the present disclosure can be stored on a non-transitory (e.g., tangible or physical) computer readable storage medium, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for modifying a task flow template, the method comprising:

receiving, by a processor deployed in a communications network and over the communications network associated with a network service provider, a request to modify the task flow template associated with a deployment of a new hardware network resource, wherein the task flow template is associated with a plurality of task flow modification rules, wherein the task flow template comprises a plurality of tasks implemented in a business process execution language format;

determining, by the processor, whether the request violates any one of the plurality of task flow modification rules, wherein a first rule of the plurality of task flow modification rules specifies that no automated tasks in the task flow template can be deleted, wherein a second rule of the plurality of task flow modification rules specifies that no automated task in the task flow template can be rearranged to precede another automated task on which it depends, wherein a third rule of the plurality of task flow modification rules specifies that no durational rule of each automated task in the task flow template is changeable, wherein a fourth rule of the plurality of task flow modification rules specifies that an approved automated task can be inserted into the task flow template and a non-approved automated task cannot be inserted into the task flow template;

rejecting the request, by the processor, when the request is determined to violate any one of: the first rule, the second rule, the third rule, and the fourth rule of the plurality of task flow modification rules;

modifying, by the processor, the task flow template in accordance with the request to produce a modified task flow template, when the request is not determined to violate any one of: the first rule, the second rule, the third rule, and the fourth rule of the plurality of task flow modification rules;

displaying, by the processor and over the communications network, on a display the modified task flow template when the task flow template is modified in accordance with the request;

receiving, by the processor, a work order and accompanying data relating to the deployment of the new hardware network resource;

creating, by the processor, a task flow instance from the modified task flow template based upon the accompanying data;

sending, by the processor via the communication network, a first instruction to at least one device to perform at least one automated task in accordance with the task flow instance; and sending, by the processor via the communication network, a second instruction to a work center to perform at least one manual task in accordance with the task flow instance.

2. The method of claim 1, wherein a fifth rule of the plurality of task flow modification rules specifies that a manual task cannot be inserted between two automated tasks in the task flow template having a rule that specifies the two automated tasks cannot be separated.

3. The method of claim 1, wherein a fifth rule of the plurality of task flow modification rules specifies that two adjacent tasks cannot be separated by more than a specified time duration when inserting a new task.

4. The method of claim 1, wherein a fifth rule of the plurality of task flow modification rules specifies whether a manual task is moveable.

5. The method of claim 1, wherein a task in the task flow template has a rule that specifies that an inclusion rule of the task is changeable for manual tasks and is not changeable for automated tasks, wherein the inclusion rule is for determining conditions under which the task is included in a task flow instance derived from the task flow template.

6. A non-transitory computer-readable medium storing instructions which, when executed by a processor deployed in a communications network, cause the processor to perform operations for modifying a task flow template, the operations comprising:

receiving over the communications network associated with a network service provider, a request to modify the task flow template associated with a deployment of a new hardware network resource, wherein the task flow template is associated with a plurality of task flow modification rules, wherein the task flow template comprises a plurality of tasks implemented in a business process execution language format;

determining whether the request violates any one of the plurality of task flow modification rules, wherein a first rule of the plurality of task flow modification rules specifies that no automated tasks in the task flow template can be deleted, wherein a second rule of the plurality of task flow modification rules specifies that no automated task in the task flow template can be rearranged to precede another automated task on which it depends, wherein a third rule of the plurality of task flow modification rules specifies that no durational rule of each automated task in the task flow template is changeable, wherein a fourth rule of the plurality of task flow modification rules specifies that an approved automated task can be inserted into the task flow template and a non-approved automated task cannot be inserted into the task flow template;

rejecting the request when the request is determined to violate any one of: the first rule, the second rule, the third rule, and the fourth rule of the plurality of task flow modification rules;

modifying the task flow template in accordance with the request to produce a modified task flow template, when the request is not determined to violate any one of: the first rule, the second rule, the third rule, and the fourth rule of the plurality of task flow modification rules;

displaying over the communications network, on a display the modified task flow template when the task flow template is modified in accordance with the request;

receiving a work order and accompanying data relating to the deployment of the new hardware network resource;

creating a task flow instance from the modified task flow template based upon the accompanying data;

sending, via the communication network, a first instruction to at least one device to perform at least one automated task in accordance with the task flow instance; and sending, via the communication network, a second instruction to a work center to perform at least one manual task in accordance with the task flow instance.

7. The non-transitory computer-readable medium of claim 6, wherein a fifth rule of the plurality of task flow modification rules specifies that a manual task cannot be inserted between two automated tasks in the task flow template having a rule that specifies the two automated tasks cannot be separated.

8. The non-transitory computer-readable medium of claim 6, wherein a fifth rule of the plurality of task flow modification rules specifies that two adjacent tasks cannot be separated by more than a specified time duration when inserting a new task.

9. A method for modifying a task flow instance, the method comprising:

receiving, by a processor, a work order and accompanying data relating to an activity, wherein the activity comprises a deployment of a new hardware network resource;

retrieving, by the processor, a task flow template, wherein the task flow template corresponds to the activity;

creating, by the processor, the task flow instance from the task flow template based upon the accompanying data;

receiving, by the processor, a request to modify the task flow instance, wherein the task flow instance is associated with a plurality of task flow modification rules, wherein the task flow instance comprises a plurality of tasks implemented in a business process execution language format;

determining, by the processor, whether the request violates any one of the plurality of task flow modification rules, wherein a first rule of the plurality of task flow modification rules specifies that no automated tasks in the task flow instance can be deleted, wherein a second rule of the plurality of task flow modification rules specifies that no automated task in the task flow instance can be rearranged to precede another automated task on which it depends, wherein a third rule of the plurality of task flow modification rules specifies that no durational rule of each automated task in the task flow instance is changeable, wherein a fourth rule of the plurality of task flow modification rules specifies that an approved automated task can be inserted into the task flow instance and a non-approved automated task cannot be inserted into the task flow instance;

rejecting the request, by the processor, when the request is determined to violate any one of: the first rule, the second rule, the third rule, and the fourth rule of the plurality of task flow modification rules;

modifying, by the processor, the task flow instance in accordance with the request to produce a modified task flow instance, when the request is not determined to violate any one of: the first rule, the second rule, the third rule, and the fourth rule of the plurality of task flow modification rules;

displaying, by the processor over the communications network, on a display the modified task flow instance when the task flow instance is modified in accordance with the request;

sending, by the processor via the communication network, a first instruction to at least one device to perform at least one automated task in accordance with the modified task flow instance; and sending, by the processor via the communication network, a second instruction to a work center to perform at least one manual task in accordance with the modified task flow instance.

10. The method of claim 9, wherein a fifth rule of the plurality of task flow modification rules specifies that a task cannot be inserted between two tasks in a sequence of tasks where one of the tasks in the series of tasks is currently being performed, wherein a rule of the task flow instance is associated with the sequence of tasks and specifies that the sequence of tasks cannot be interrupted.

11. The method of claim 9, wherein the creating the task flow instance from the task flow template comprises evaluating conditional rules of the task flow template to select tasks from the task flow template to include in the task flow instance.

12. The method of claim 9, wherein the accompanying data comprises:
a location where the activity is to take place.

13. The method of claim 9, wherein the accompanying data comprises:
a number of available personnel to perform manual tasks.

14. The method of claim 9, wherein the accompanying data comprises:
a budget for the activity.

15. The method of claim 9, wherein the displaying comprises:
presenting a view of the modified task flow instance which includes:
a listing of tasks in the modified task flow instance;
a completion status of each of the tasks; and
a time when each of the tasks that is not completed is anticipated to be completed.

16. The method of claim 15, wherein each task in the modified task flow instance has an associated durational rule, wherein the time when each task that is not completed is anticipated to be completed is calculated based upon a pre-evaluation of the associated durational rule.

17. The method of claim 9, wherein the displaying comprises:
re-evaluating a conditional rule of each of a plurality of uncompleted task in the modified task flow instance; and
updating a view of the task flow to include a revised anticipated completion time of each of the plurality of uncompleted tasks in the modified task flow instance up to the next planning point.

18. The method of claim 17, wherein each of the plurality of uncompleted tasks comprises a task in the modified task flow instance between a task that is the subject of the request and a next planning point.

* * * * *